C. T. LAMB.
DEMOUNTABLE RIM EXPANDING TOOL.
APPLICATION FILED OCT. 20, 1917.

1,300,741.

Patented Apr. 15, 1919.

Inventor
CLAUDE T. LAMB

By H. S. Kiel

Attorney

UNITED STATES PATENT OFFICE.

CLAUDE T. LAMB, OF TERRE HAUTE, INDIANA.

DEMOUNTABLE-RIM-EXPANDING TOOL.

1,300,741.              Specification of Letters Patent.          Patented Apr. 15, 1919.

Application filed October 20, 1917. Serial No. 197,614.

*To all whom it may concern:*

Be it known that I, CLAUDE T. LAMB, a citizen of the United States, residing at Terre Haute, in the county of Vigo, State of Indiana, have invented new and useful Demountable-Rim-Expanding Tools; and I do hereby declare the following to be a full, clear, and exact description of the invention, such as will enable others skilled in the art to which it appertains to make and use the same.

The present invention relates to a tool for expanding demountable rims, and has for its object to provide a device of this character which embodies novel features of construction whereby the rim can be easily and quickly expanded to facilitate breaking the connection between the ends thereof when removing a tire from the rim, or springing the ends of the rim into proper locking relation when placing a tire upon the rim.

Further objects of the invention are to provide an expanding tool for demountable rims which is comparatively simple and inexpensive in its construction, which can be quickly applied to the rim or removed therefrom, which can be easily manipulated by a single person, and which will greatly decrease the labor incident to placing a tire in position upon the rim or removing it therefrom.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
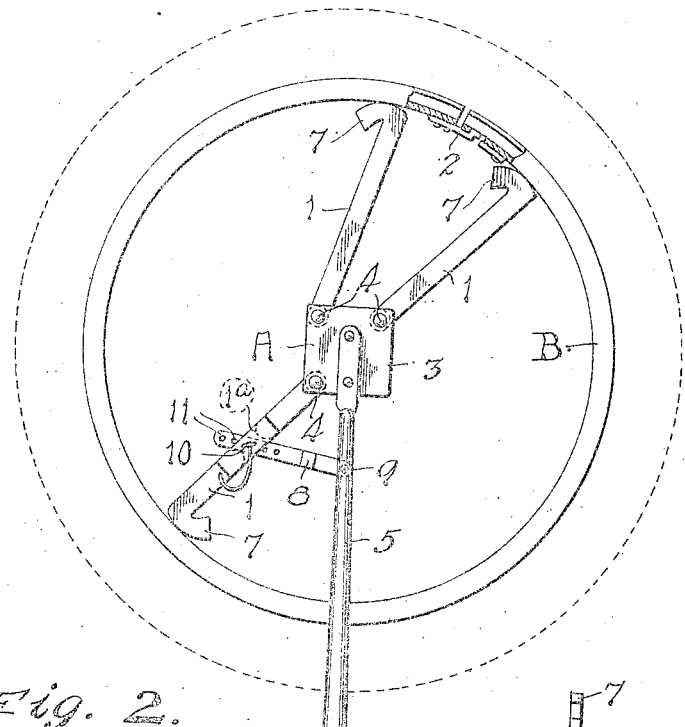
Figure 1 is a front elevation of a rim expanding tool constructed in accordance with the invention, the tool being shown as applied to a demountable rim and swung into position for expanding the rim to separate the ends thereof, portions of the rim being broken away and shown in section.
Figure 2:
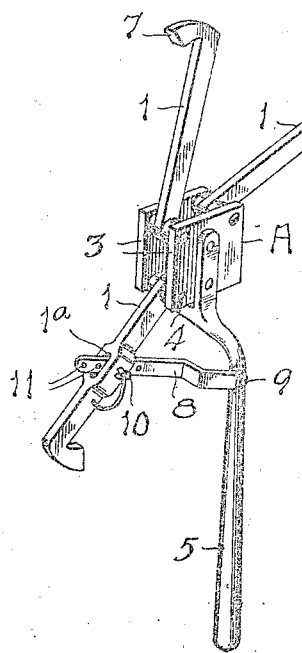
Fig. 2 is a perspective view of the demountable rim expanding tool.

Referring to the drawings, which illustrate one possible embodiment of the invention, the reference character A designates a central body to which a series of rim expanding arms 1 are pivotally connected and arranged in such a manner as to have a cam action for expanding the rim when the central body is rotated in the plane of the rim. The reference character B designates a conventional demountable rim which is provided with suitable fastening means 2 for locking the ends thereof together when the rim has a tire thereon and is ready for use. The central body may be conveniently constructed of a pair of spaced plates 3 which are similar in construction, being shown in the present instance as having a square configuration. These spaced plates 3 are connected at three of their corners by pivot bolts 4 which engage the inner ends of the rim expanding arms 1. The operating handle 5 is provided with a forked end 5$^a$ which straddles the central body A and is riveted or otherwise rigidly secured thereto, as indicated at 6, the body portion of the handle being offset outwardly away from the plane of the body and expanding arms so that it will swing above the rim and tire when the tool is in use, as indicated by Fig. 1.

The outer ends of the rim expanding arms 1 terminate in feet 7 which are adapted to engage the inner periphery of the demountable rim. Where there are three arms, as in the present instance, two of the arms will be caused to engage the demountable rim at points on opposite sides of the break therein, while the third arm will engage the demountable rim at a point diametrically opposite the said break. These several expanding arms 1 are each of such a length as to be initially inclined to radial lines extending from the center of the body A through the respective pivot bolts 4, and with this arrangement it will be obvious that when the operating handle 5 is manipulated to rotate the body and cause the arms 1 to approach radial positions, the outer ends of the arms will be forced outwardly by a cam action so as to expand the demountable rim and separate the ends thereof, as indicated by Fig. 1. The outer faces of the feet 7 may, as shown, have a cam formation so as to cooperate with the swinging of the arms to expand the rim, and suitable locking means, such as the bar 8, may be provided for holding the tool in operative position, thereby leaving the operator free to use both hands to manipulate a screw-driver or like tool for releasing the fastening means 2 of the demountable rim, or for placing the screw-driver in such a position that the ends of the demountable rim will slip over each other when the expanding tool is removed. This locking bar 8 is shown as pivotally connected at 9 to the operating handle 5, and as passing slidably through a looped keeper 1ª which is formed at an intermediate point in the length of one of the expanding arms 1. A locking pin 10 passes through the keeper 1ª and is adapted to engage any selected one of a series of openings 11 in the bar 8 to hold the bar and operating handle in position. With this construction it will be understood that when placing the tool in position the rim expanding arms 1 are all swung in the same general direction to positions at sufficiently great angles to radial lines extending from the center of the body A to admit of the device being placed in proper position within the demountable rim B. The handle 5 is then manipulated to rotate the central body A and decrease the angular relation between the expanding arms 1 and radial lines extending from the body A, the outer ends of the arms being thus forced outwardly and the cam surfaces of the feet 7 brought into operation for expanding the demountable rim and separating the ends thereof. When removing an old tire from the demountable rim a screw-driver or like tool will be used for causing the ends of the rim to slip over each other when the expanding tool is removed, while when placing a new tire in position upon the rim the ends of the rim will be brought into proper position for springing into a locking relation when the tool is removed.

Figure 4:
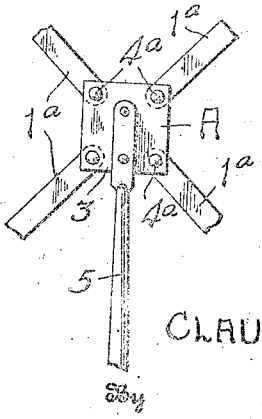
Fig. 4 is a detail view showing a slight modification of the invention.
Figure 3:
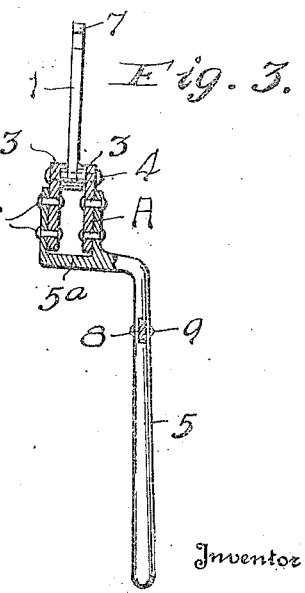
Fig. 3 is a transverse sectional view through the tool.

Fig. 4 illustrates a slight modification in which four rim expanding arms 1ª, corresponding to the arms 1 of the previously described construction, are pivotally connected by the bolts 4ª to the four corners of the square body A. The operating handle 5 is rigidly secured to the central body A, exactly as in the previous instance, and the rim expanding arms 1ª have a construction identical with that of the arms 1. It will thus be obvious that by swinging all of the arms 1ª in the same direction to contract the tool it can be readily placed in a demountable rim, and the rim subsequently expanded in the desired manner by manipulating the handle 5 and rotating the central body A to move the expanding arms toward a radial position with respect thereto.

Having thus described the invention, what I claim as new and desire to secure by Letters Patent, is:—

1. A tool for expanding demountable rims, including a central body, a handle rigid with the body and projecting laterally therefrom for rotating the body in the plane of the rim, a series of expanding arms projecting from the body in an angular relation and pivotally connected to the body at their inner ends, and cam feet projecting laterally from the outer ends of the arms in the plane of the body, said cam feet having outer curved faces which are eccentrically arranged with respect to the body and have a rolling contact and cam action upon the rim to assist in expanding the rim when the central body is rotated to move the arms toward radial positions with respect thereto.

2. A tool for expanding demountable rims, including a pair of similar spaced plates, a handle formed with a forked end which straddles the spaced plates and is rigidly secured to the outer faces thereof, pivot pins rigidly connecting edge portions of the spaced plates, and rim expanding arms having the inner ends thereof received between the spaced plates and loosely mounted upon the pivot pins, said arms projecting from the body in an angular relation and terminating in feet adapted to engage the rim to expand the same when the central body is rotated to swing the arms toward a radial position with respect thereto.

3. A tool for expanding demountable rims, including a pair of similar and spaced plates, a handle formed with a forked end which straddles the spaced plates and is rigidly secured to the outer faces thereof, pivot pins rigidly connecting edge portions of the spaced plates, rim expanding arms having the inner ends thereof received between the spaced plates and loosely mounted upon the pivot pins, the outer ends of the arms terminating in feet which engage the rim and the intermediate portion of one of the arms being provided with a looped keeper, and a locking bar pivotally connected to the handle and adjustably received within the looped keeper of the expanding arm for holding the tool in operative position.

In testimony whereof I have signed my name to this specification in the presence of two subscribing witnesses.

CLAUDE T. LAMB.

Witnesses:
STEPHEN R. CHAPPELL,
Z. M. APPLE.